Aug. 28, 1951 R. S. RAINEY ET AL 2,566,249
METHOD FOR MAKING SHIMS
Filed July 28, 1949 2 Sheets—Sheet 2
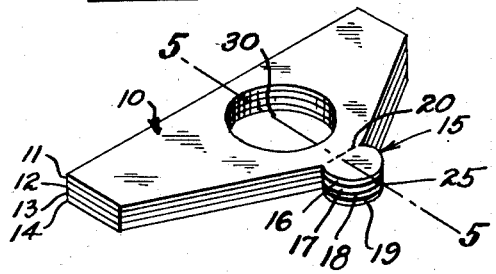
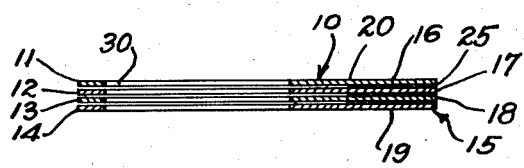
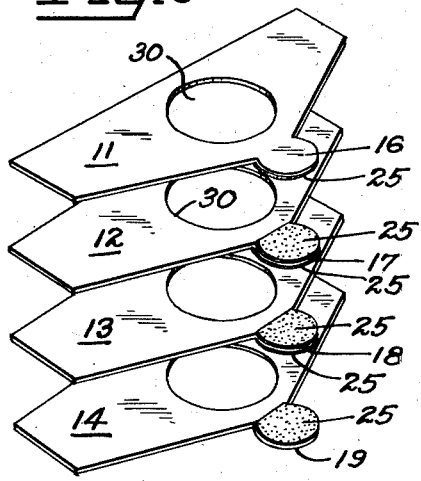
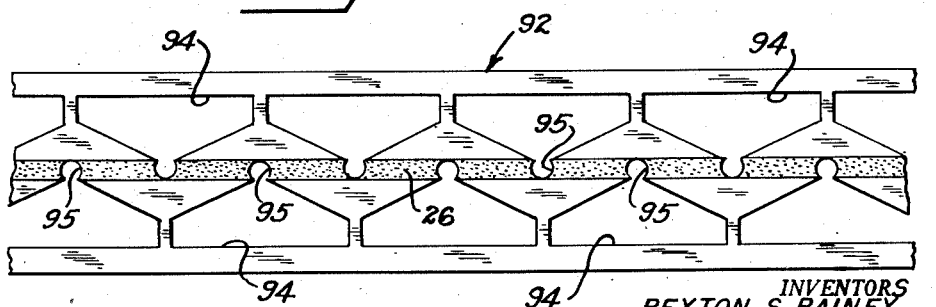
INVENTORS
REXTON S. RAINEY
HUGH T. STEWART
BY FRED A. HELFRECHT
ATTORNEY Patented Aug. 28, 1951

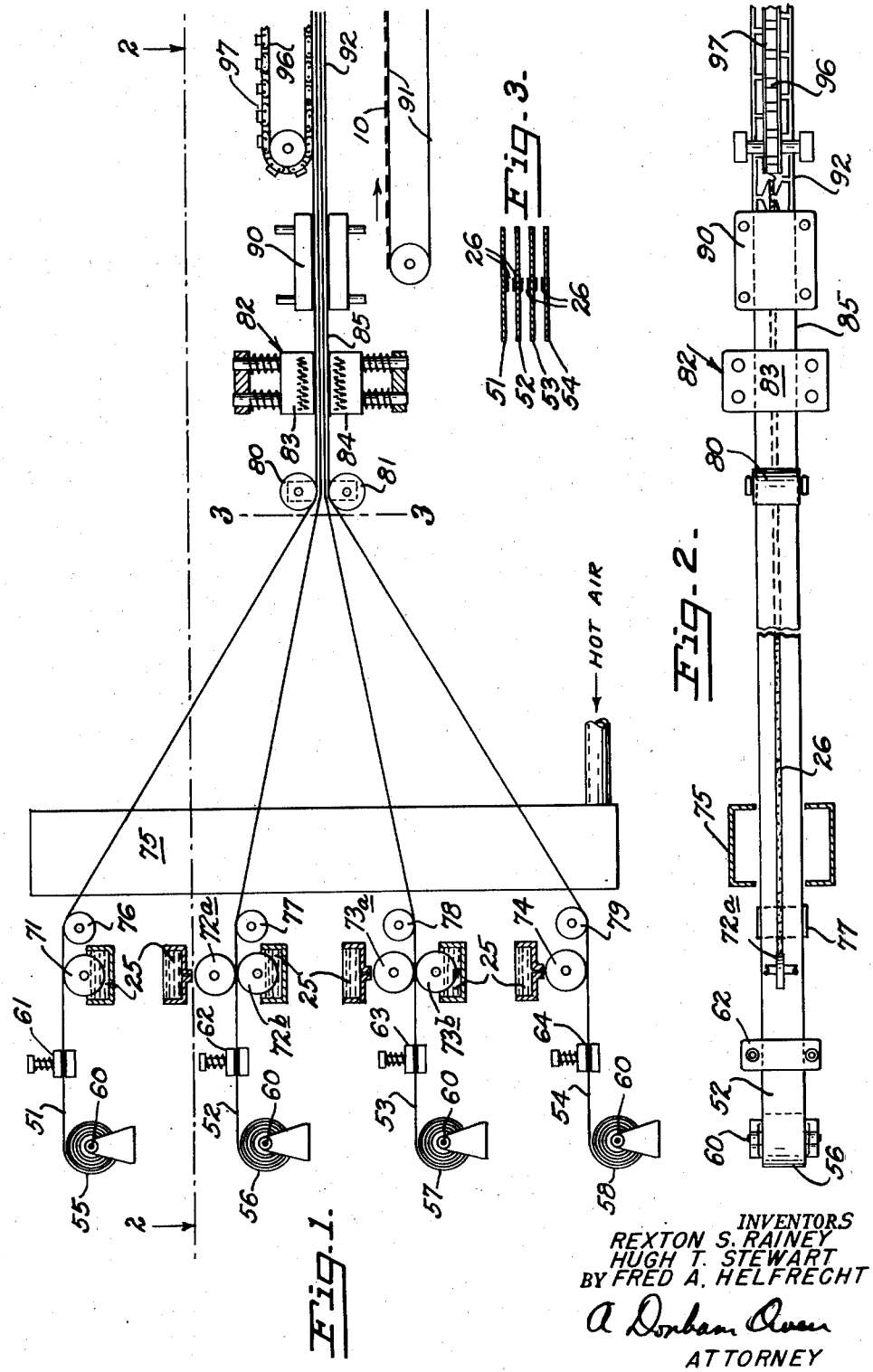

2,566,249

UNITED STATES PATENT OFFICE 2,566,249

METHOD FOR MAKING SHIMS

Rexton S. Rainey, Palo, Alto, Hugh T. Stewart, Atherton, and Fred A. Helfrecht, Redwood City, Calif., assignors to National Motor Bearing Co., Inc., Redwood City, Calif., a corporation of California Application July 28, 1949, Serial No. 107,336

12 Claims. (Cl. 154—125)

This invention relates to a method for the manufacture of shims; more particularly it relates to a method for the manufacture of laminated tab shims.

The product which results from the practice of this method is described in detail and is claimed in the co-pending application, Serial No. 107,330, filed July 28, 1949. It is composed of several leaves of shim stock bonded together only at a small tab portion which is torn off after the assembled shim is inserted. When the tab is removed, the leaves are left separate because no part of them is bonded except the tab. Then when adjustment is made to reduce the clearance between the bearing halves or other space where shims are inserted, one or more leaves may be lifted off freely and taken out without disturbing the other layers and without having to separate it off from them because they are already separate; nothing but the bearing parts hold the shim together once the tab is torn off.

Great care must be taken to assure precision in these tab shims, because they are used to correct and to adjust clearances of the order of one or two thousandths of an inch. Moreover the automotive industry requires hundreds of thousands of such shims each year; so they must be made in quantity. It is true that such shims can be made individually by assembling a plurality of cut tabbed leaves and cementing the tabs together, but this method is slow and inaccurate. The problem was to find a method of rapidly making such precision parts in larger quantities, and this invention has solved those problems by a method which comprises bonding a plurality of layers of strip stock into a laminated matrix and then punching out the individual shims from the matrix. This method also solves the problem of how to achieve continuous manufacture of tab shims in an assembly line process.

A more specific form of the method of this invention comprises feeding a plurality of strips of shim stock, corresponding in number to the number of leaves desired in the completed shim; applying a narrow ribbon of a suitable bonding agent to a sufficient number of said strips to insure their accurate bonding later on; registering the ribbons of bonding agent and then pressing said strips together so as to bond them along said ribbon and form of them a laminated matrix; and then to punch out the shims from the laminated matrix, so that only the tab portions are punched from the ribbon area of the matrix.

The method is preferably practiced on an assembly-line where it can rapidly produce large numbers of laminated tab shims of the type where the tabs of the various leaves are adhesively bonded together. Among the objects achieved are the enabling of rapid and accurate manufacture of large numbers of such shims; the providing of a continuous process; and the limiting of adhesive strictly to the tab.

Other objects and advantages of the invention will appear from the following description of a preferred embodiment. It is not intended to limit the invention to the details of this embodiment which are given in order to comply with the statutory requirement of U. S. Revised Statutes Section 4888; the scope of the invention is defined by the appended claims.

In the drawings:

Fig. 1 is a diagrammatic view in elevation of an assembly-line which may be used in practising the method of this invention.

Fig. 2 is a view taken along the line 2—2 in Fig. 1.

Fig. 3 is an enlarged view in section taken along the line 3—3 in Fig. 1.

Fig. 4 is an enlarged view in perspective of a shim produced by practising the method of this invention. The thicknesses are, of necessity, greatly exaggerated, for the usual thickness of each layer is in the nature of one or two thousandths of an inch, and the bonding layer at the tab is even thinner.

Fig. 5 is a view in section taken along the line 5—5 of Fig. 4, the thicknesses still being exaggerated.

Fig. 6 is an exploded view in perspective of the shim shown in Fig. 4.

Fig. 7 is an enlarged top plan view of a blank from which shims like those shown in Figs. 4 to 6 have been stamped out.

Before describing the method, brief reference will be made to the product which results, in order that the purpose of the method may be clearly understood.

The shim 10 shown in Figs. 4 to 6 is composed of a plurality of layers of thin leaves or laminations 11, 12, 13 and 14. Four layers are shown in the drawing, but there may be more or fewer of them. The leaves 11—14 may be made from any suitable material. For example, all of the leaves 11—14 may be brass or the two outside leaves may be brass and the inner leaves may be aluminum in order to prevent the shim from being bonded together when the bearing is tinned. The leaves 11—14 may be uniform in thickness or may be of different thicknesses, according to the use for which the shim is intended. Usually they are made about 0.001 or 0.002 inch thick.

The shim 10 has a tag 15 built up of several tab segments 16, 17, 18 and 19 which are integral with their respective leaves 11, 12, 13 and 14. The tab segments 16—19 are preferably very small and their line of juncture 20 with the leaves 11—14 is very short. The tab segments 16—19 are adhesively bonded together by several layers of some suitable agent 25. The bonding agent 25 may be rubber cement, glue, or any other material which will hold the tab segments together. In order to suit particular installations a hole 30 may be punched in each shim, to fit around the bolt or stud where it is used.

Once the shim 10 has been installed in place, the tab 15 is torn off. The leaves 11—14 are then completely separate and may readily be removed separately, if that is necessary in order to adjust the clearance. In order to permit this separation, the bonding adhesive must be strictly limited to the tab. It is also necessary that the leaves and tabs be precisely registered and that the tabs be easy to tear off.

A preferred embodiment of the method of this invention is shown in Figs. 1 to 3. This method employs a continuous production line so as to save time, reduce the amount of handling, and make the operations as automatic as possible. However, the matrix may be prepared on one production line and the tab shims punched out on another production line remote from the first line. For purposes of illustration, the production of the four-layer laminated shim 10 is illustrated, but shims of fewer or more layers may be made by analogous processes.

Four strips 51, 52, 53 and 54 of suitable strip stock are fed, respectively, from four stock rolls or magazines 55, 56, 57 and 58. The rolls 55—58 are supported one above the other on shafts 60 mounted for free rotation preferably about 10 or 12 inches apart. The strips 51—54 are moved synchronously, and a preferred method of accomplishing this will be described later. As each strip 51—54 leaves its roll 55—58, it passes through an adjustable spring loaded friction block 61—64, where the tension on each strip is adjusted so that all of the strips will feed evenly at the same rate and without slack, no matter whether the rolls 55—58 are full or nearly empty. The friction blocks 61—64 also prevent the rolls 55—58 from unwinding too fast as their inertia decreases.

At the next station a narrow ribbon 26 of a bonding agent 25 is secured along the center of the strips 51—54. Preferably, the bonding adhesive 25 is fed from tanks 70 and put on the strips 51—54 by grooved rollers 71, 72a, 72b, 73a, 73b, and 74. Preferably, the bottom surface only of the top strip 51 is coated with a narrow ribbon 26 of the agent 25 which comes from the groove of its grooved roller 71, and the bottom 54 strip may be similarly coated only on top by its roller 74. The two center strips 52 and 53 are preferably coated on both sides by two pairs of rollers 72a, 72b, and 73a, 73b. With some adhesives only the two center strips will be coated, because one layer of adhesive will be enough, or the adhesive may be applied in still different patterns. The narrow ribbons 26 of adhesive 25 should be carefully aligned and preferably they all lie on the same central location on each strip. Then, when the strips 51—54 are later forced together, they will be cemented together only along this narrow central zone 26. It is, however, possible to apply the ribbon 26 along the edge or in an offset position, should that be desirable in a particular case.

Guide rollers 76—79 may be placed adjacent the rollers 71—75, to divert the line of travel of the strips 51—54. The next step is to pass the ribbon-coated strips 51—54 through a drying oven or hot air hood 75, where the bonding agent 25 is partially or completely dried, depending on the type of adhesive used; (e. g. rubber cement). With some bonding agents 25, the hood 75 is unnecessary and may be dispensed with. When the strips come out of the oven 75 they move down toward a focal point at rollers 80 and 81, where all four strips 51—54 are run together in strict alignment.

From the rollers 80, 81, the four overlapping contiguous strips 51—54 are fed into a sealing press 82, where two spring loaded hot plates 83 and 84 bear against the strips and cause the adhesive 25 to seal them together along the narrow central ribbons 26. The strips are now formed into a bonded matrix 85. The matrix 85 shown in the drawings is four ply because four strips 51—54 were used, but it could be a two-ply, three-ply, or five-ply matrix or it could have still more plies if a shim having that many plies should be desirable for a particular application.

The four-ply laminated matrix 85 may then pass through a die punch press 90 where the tabbed shims 10 are punched out, leaving a latticed blank 92. (See Fig. 7.) This may be continuous as shown, or the matrix 85 may be accumulated as storage for later punching at a different location. The shims 10 are preferably punched out two at a time (one from each side of the strips), with the tab 15 punched from the portion where the over-lying registered bonding ribbons 26 are. The blank 92 will have a row of holes 94 on each side where the body of the shim 10 was punched and an adjoining row of holes 95 down the center where the tabs were punched. Various patterns of shims and tabs may be produced from a given matrix 85 simply by changing the die in the punch press 90. The finished shims 10 may fall down from the press 90 on to stacking pins (not shown) which pass through the hole 30 and be accumulated in groups, or they may fall on to a conveyor belt 91, which carries them away to a packing station (not shown).

Preferably the motive power for operating this process is a long endless chain 96 having projecting sprockets 97, which run above or below the blank 92 at a point somewhere past the die press 90. The chain 96 preferably is synchronized for intermittent motion with the press 90, and the sprockets 97 preferably engage the holes 95 down the center of the blank 92 where the tabs 15 were punched out from the matrix. Because the holes 95 lie in the center of the blank 92 and also lie along the bonded ribbon area, the sprockets 97 pull all the strips 51—54 along with no side twist and at exactly the same tension. With this type of motive power there is no tendency for the strips 51—54 to get out of registration. Instead of this motive power, a pair of friction rollers (not shown) may engage the complete width of both sides of the blank 92 and move it along intermittently in synchronization with the punch press 90.

By punching the shims 10 from a bonded matrix which has previously been accurately positioned so as to register the bonding ribbons 26, the shims 10 themselves are accurately registered and are cut with great precision. Thousands of such precision pieces may be made in a single day by using this method.

What is claimed is:

1. A method for manufacturing laminated shims of the type secured together by an adhesively bonded removable tab, comprising the steps of forming a laminated matrix from a plurality of strips of shim stock corresponding in number to the number of leaves desired in the finished shim, said matrix being bonded together by registered ribbons of adhesives; and then punching shims of the desired pattern out of said matrix, the tab portion of said shims, and only the tab portion, being punched out from said ribbon area.

2. A method of manufacturing laminated tab shims comprising the steps of adhesively bonding together a plurality of strips of shim stock along a narrow, registered ribbon area, and punching shims therefrom, each shim having a tab punched from the ribbon area.

3. A method for the continuous manufacture of laminated tab shims, comprising the steps of applying narrow continuous ribbons of adhesive over corresponding areas of a plurality of continuously fed strips, continuously bonding said strips together with said ribbons registered, and intermittently punching shims from said matrix at regular intervals, said shims having a tab portion punched from said registered ribbon area.

4. A method for manufacturing laminated shims comprising applying a narrow ribbon of bonding agent along at least one of each contiguous pair of surfaces of a plurality of strips of shim stock, registering said ribbons together, bringing said strips together into a matrix secured together only by said ribbons; and punching therefrom shims having the desired pattern including a tab, said tab being the only part punched out of the bonded region.

5. A method for the manufacture of laminated shims comprising applying a continuous ribbon of bonding agent to a plurality of moving strips of shim stock; registering said ribbons; bonding said strips together to form a matrix held together solely by said registered ribbons; and punching from said matrix, shims having the desired pattern, each including an integral tab punched from the bonded portion of said matrix, the rest of said shim being punched from the unbonded portion of said matrix.

6. A method for the continuous manufacture of laminated tab shims, comprising continuously feeding a plurality of strips of metal of substantially the same width said strips being spaced apart vertically over one another and in alignment; continuously applying to all except the outer surfaces of the outermost strips a narrow central ribbon of adhesive material; continuously drying said adhesive ribbons; continuously bringing said strips together under pressure to bond said ribbons together and form a matrix; and punching from said matrix at regular intervals shims, each having a tab punched from the ribbon area, the rest of said shim being punched from outside said ribbon area.

7. The method of claim 6 in which the feeding is accomplished by engaging the blank from which the shims have been punched along the central area where the tabs were punched out.

8. A method for manufacturing a matrix from which laminated shims may be punched, comprising applying a narrow ribbon of bonding agent along at least one of each contiguous pair of surfaces of a plurality of strips of shim stock, registering said ribbons together, and bringing said strips together into a matrix secured together only by said ribbons.

9. A method for the continuous manufacture of laminated shims comprising applying a continuous ribbon of bonding agent to a plurality of moving strips of shim stock, registering said ribbons, bonding said strips together to form a matrix held together solely by said registered ribbons and punching from said matrix shims having the desired pattern, each including an integral tab punched from the bonded portion of said matrix, the rest of said shim being punched from the unbonded portion of said matrix.

10. The method of claim 9 in which said strips are moved by engaging the blank from which the shims were punched and pulling it along continuously.

11. The method of claim 10 in which the engaging is done in the portion of the blank from which the tabs were punched.

12. A method for the manufacture of a matrix which may be used to produce laminated tab shims, comprising continuously feeding a plurality of strips of metal of substantially the same width, said strips being spaced apart vertically over one another and in alignment; continuously apply to all except the outer surfaces of the outermost strips a narrow central ribbon of adhesive material; continuously drying said adhesive ribbons; and continuously bringing said strips together under pressure to bond said ribbons together and form a matrix.

REXTON S. RAINEY.
HUGH T. STEWART.
FRED A. HELFRECHT.

REFERENCES CITED

The following references are of record in the file of this patent:

UNITED STATES PATENTS

| Number | Name | Date |
|---|---|---|
| 1,839,889 | Palais | Jan. 5, 1932 |
| 2,220,071 | Avery | Nov. 5, 1940 |
| 2,237,346 | Gilfillan | Apr. 8, 1941 |
| 2,304,787 | Avery | Dec. 15, 1942 |
| 2,417,175 | Raffles | Mar. 11, 1947 |
| 2,473,307 | Seipt et al. | June 14, 1949 |
| 2,511,303 | Stevens et al. | June 13, 1950 |